(12) United States Patent
Chuang et al.

(10) Patent No.: US 6,741,475 B1
(45) Date of Patent: May 25, 2004

(54) PORTABLE ELECTRONIC APPARATUS WITH REPLACEABLE BUILT-IN EXTERNAL POWER SUPPLY MODULE

(75) Inventors: Wei-Pin Chuang, Taipei (TW); Chih-Chuan Cheng, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 10/329,369

(22) Filed: Dec. 27, 2002

(30) Foreign Application Priority Data

Nov. 15, 2002 (TW) ..................................... 91218419 U

(51) Int. Cl.[7] ................................................. H05K 7/16
(52) U.S. Cl. ..................... 361/727; 361/717; 174/16.3; 165/80.3
(58) Field of Search ................................. 361/679–687, 361/724–727, 704–705, 708–710, 717–719; 174/16.3, 35 R, 252; 165/80.3, 185

(56) References Cited

U.S. PATENT DOCUMENTS 5,606,519 A * 2/1997 Viletto .......................... 361/685
5,625,535 A * 4/1997 Hulsebosch et al. ......... 361/719

* cited by examiner

Primary Examiner—Hung Van Duong
(74) Attorney, Agent, or Firm—Bacon & Thomas, PLLC

(57) ABSTRACT

An electronic apparatus includes a housing, a circuit unit, and an external power supply module. The housing is formed with a circuit receiving space and a module receiving space. The circuit unit is disposed in the circuit receiving space. A set of first contacts is disposed in the module receiving space, and is coupled electrically to the circuit unit. The external power supply module is removably disposed in the module receiving space, and is provided with a set of second contacts to connect electrically with the first contacts so as to enable the external power supply module to supply electric power to the circuit unit when the external power supply module is disposed in the module receiving space.

7 Claims, 3 Drawing Sheets

PORTABLE ELECTRONIC APPARATUS WITH REPLACEABLE BUILT-IN EXTERNAL POWER SUPPLY MODULE

CROSS-REFERENCE TO RELATED APPLICATION

This application claims priority of Taiwanese application no. 091218419, filed on Nov. 15, 2002.

BACKGROUND OF THE INVENTION

1. Field of the Invention

The invention relates to a portable electronic apparatus, more particularly to a portable electronic apparatus having a replaceable built-in external power supply module.

2. Description of the Related Art

As shown in FIG. 1, a conventional portable electronic apparatus 8, such as a notebook computer, is usually powered by an internal battery (not shown) or by an external power supply module 9. Since the capacity of the internal battery only permits operation of the apparatus 8 for a few hours, which is insufficient for long durations of use, the external power supply module 9 has thus become an essential component of the apparatus 8. However, since the external power supply module 9 of the conventional apparatus 8 is a separate accessory, inconveniences arise when the user brings the apparatus 8 with him when going on a trip. Particularly, the separate external power supply module 9 increases the bulk of the apparatus 8, and can be easily misplaced.

SUMMARY OF THE INVENTION

Therefore, the object of the present invention is to provide a portable electronic apparatus having a replaceable built-in external power supply module so as to overcome the aforesaid drawbacks associated with the prior art.

Accordingly, a portable electronic apparatus of the present invention comprises a housing formed with a circuit receiving space and a module receiving space;

a circuit unit disposed in the circuit receiving space;

a set of first contacts disposed in the module receiving space and coupled electrically to the circuit unit; and an external power supply module removably disposed in the module receiving space, the external power supply module being provided with a set of second contacts to connect electrically with the first contacts so as to enable the external power supply module to supply electric power to the circuit unit when the external power supply module is disposed in the module receiving space.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
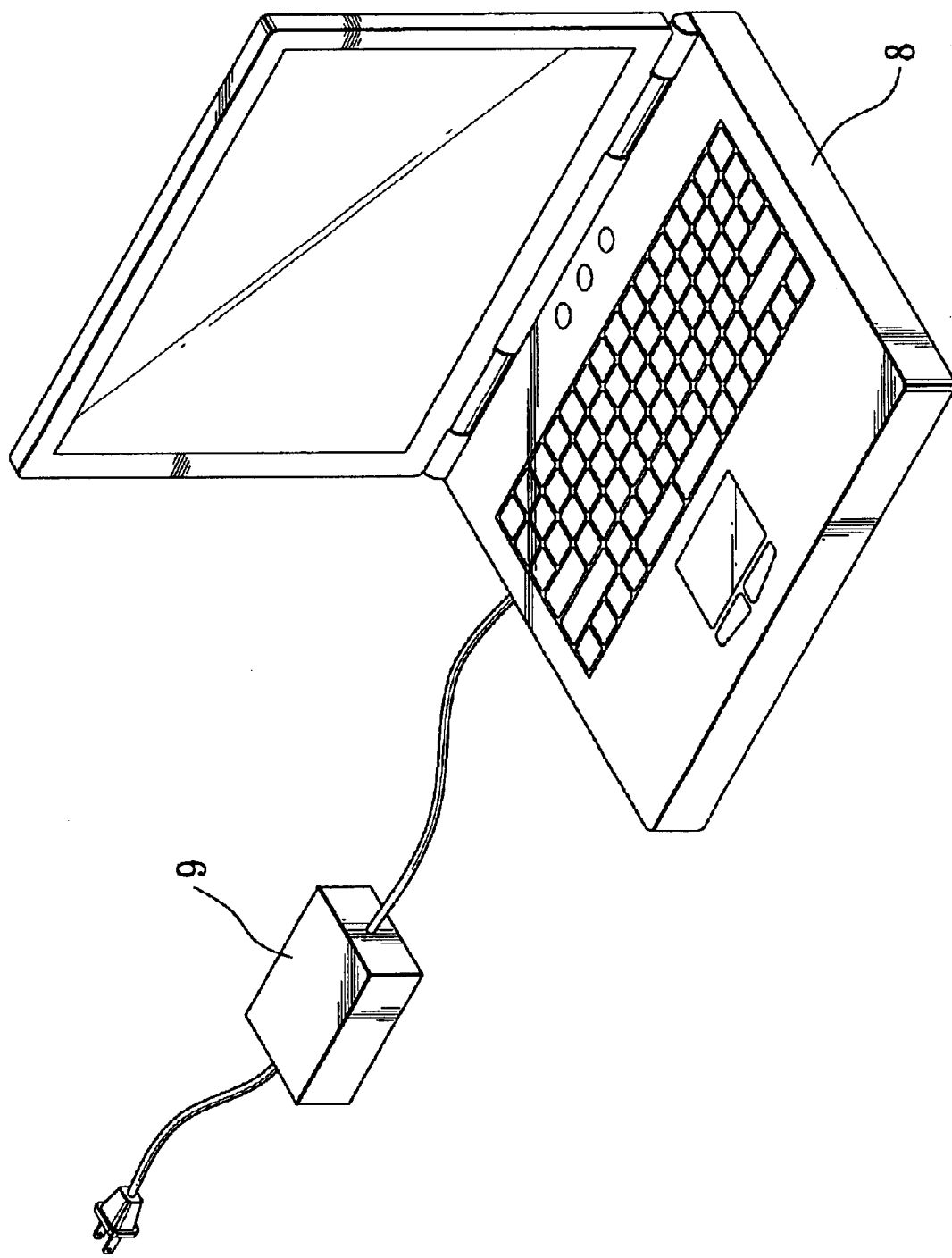
FIG. 1 is a perspective view of a conventional portable electronic apparatus with an external power supply module.
Figure 2:
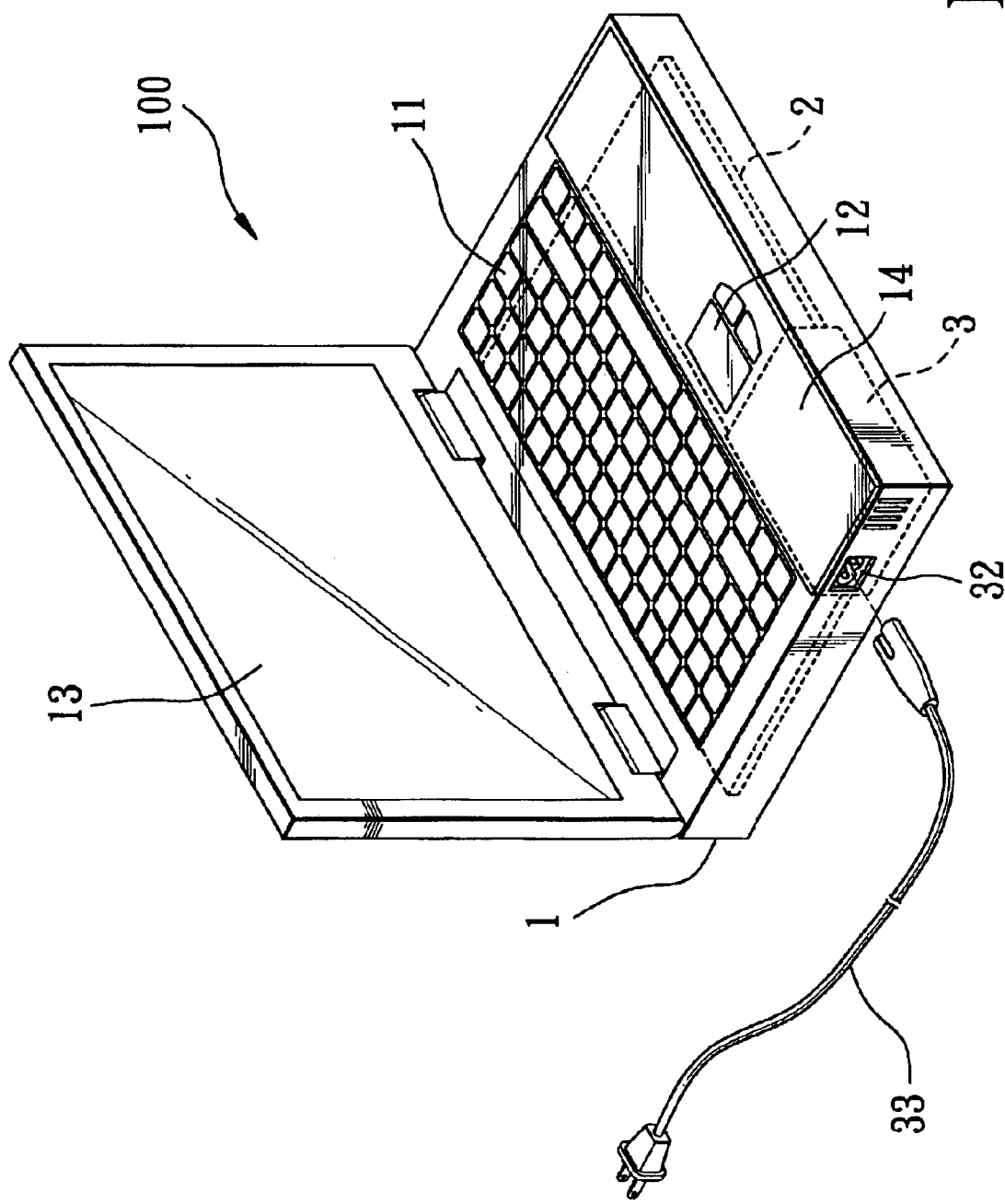
FIG. 2 is a perspective view of the preferred embodiment of a portable electronic apparatus according to the present invention.

Referring to FIG. 2, the portable electronic apparatus according to the present invention is embodied in a portable computer 100 that includes a housing 1 and an external power supply module 3 adapted to be disposed in the housing 1. The housing 1 includes first and second portions that are hinged together. The first portion, which is provided with manual input devices, such as a keyboard 11 and a touch-control pad 12, has a circuit unit 2 disposed in a circuit-receiving space thereof for controlling operations of the portable computer 100. The second portion is provided with a liquid crystal display panel 13.

Figure 3:
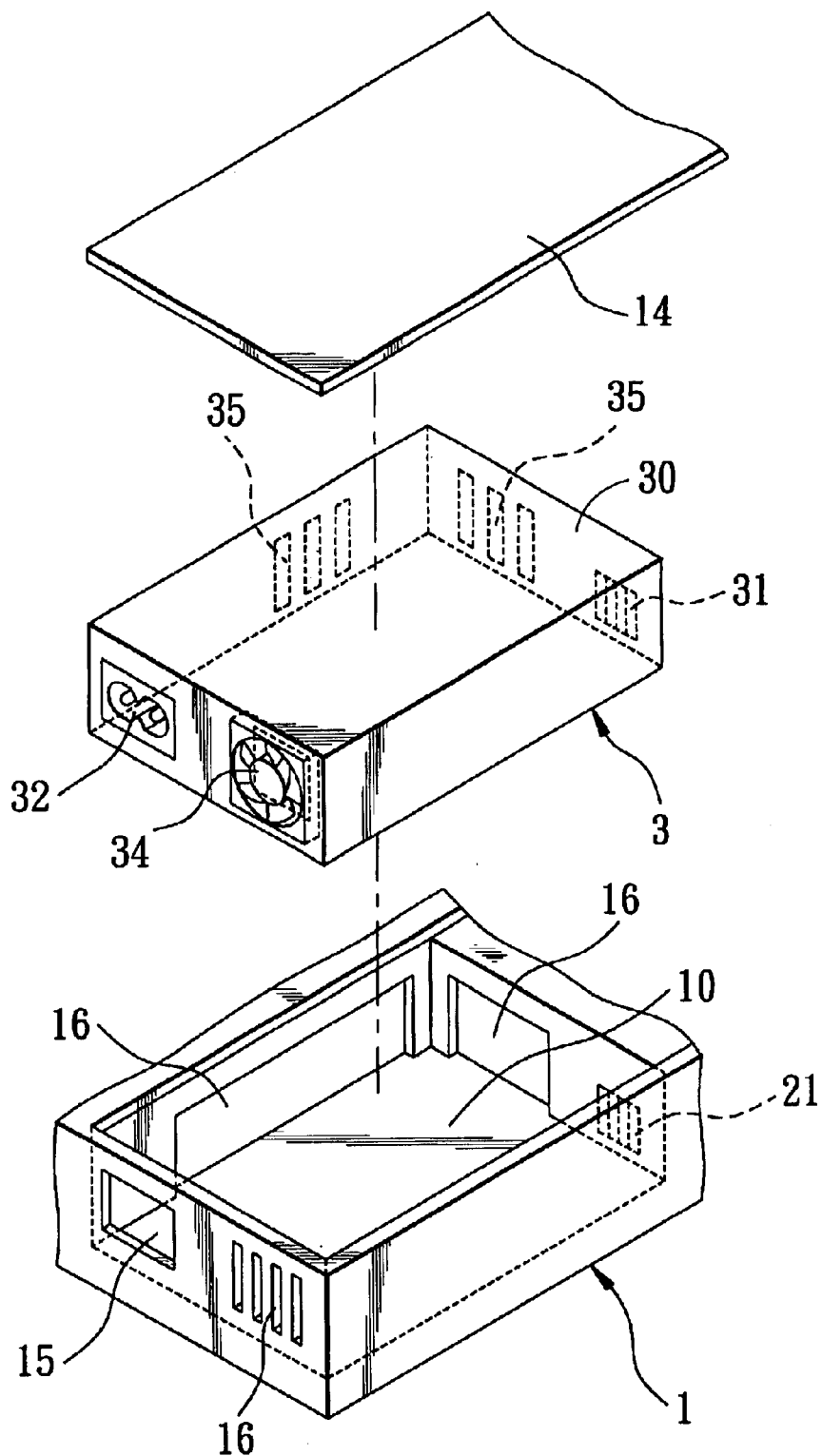
FIG. 3 is a fragmentary exploded perspective view of the preferred embodiment.

With further reference to FIG. 3, the first portion of the housing 1 of the portable computer 100 is further formed with a module receiving space 10 and a detachable panel 14 that permits access to the module receiving space 10 for installing and removing the external power supply module 3 from the module receiving space 10. A set of first contacts 21 is disposed in the module receiving space 10 and is coupled electrically to the circuit unit 2.

The external power supply module 3 is adapted to convert AC power to DC power that is to be supplied to the circuit unit 2. The external power supply module 3 has a module case 30 corresponding in size to the module receiving space 10 and provided with a cable connector 32 that is aligned a cable hole 15 in the first portion of the housing 1 when the module case 30 of the external power supply module 3 is disposed in the module receiving space 10. The module case 30 of the external power supply module 3 is further provided with a set of second contacts 31 for contacting the first contacts 21 so as to establish electrical connection between the external power supply module 3 and the circuit unit 2 such that the external power supply module 3 is able to supply electric power to the circuit unit 2 when the module case 30 of the external power supply module 3 is disposed in the module receiving space 10.

The portable computer 100 further includes an electrical cable 33 having a first end adapted to be connected to an AC power source, and a second end extended into the module receiving space 10 through the cable hole 15 to connect electrically and removably with the cable connector 32 of the external power supply module 3 when the module case 30 of the external power supply module 3 is disposed in the module receiving space 10.

In operation, AC power supplied to the external power supply module 3 through the electrical cable 33 is converted into DC power that is provided in turn to the circuit unit 2 through the first and second contacts 21, 31.

Furthermore, since the external power supply module 3 is installed inside the housing 1 and will inevitably generate heat during operation, the module case 30 of the external power supply module 3 is formed with vent holes 35, and a heat-dissipating fan 34 is mounted on the module case 30. Correspondingly, the housing 1 is formed with vent holes 16 that are in fluid communication with the module receiving space 10. Therefore, heat generated by the external power supply module 3 can be dissipated accordingly.

Since the external power supply module 3 is mounted removably inside the housing 1, there is no need for the user to carry the external power supply module 3 separately from the portable computer 100, thereby overcoming the aforesaid shortcomings of the prior art.

Moreover, since the external power supply module 3 is in the form of a replaceable module, tested electronic apparatus 8 can be exported to different countries without the external power supply module 3. Thereafter, an external power supply module 3 tested and certified by a local authority of the importing country can be installed in the module receiving space 10 to yield a final product. In this manner, production time and domestic certification of products can be greatly reduced.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A portable electronic apparatus comprising:

a housing formed with a circuit receiving space and a module receiving space;

a circuit unit disposed in said circuit receiving space;

a set of first contacts disposed in said module receiving space and coupled electrically to said circuit unit; and an external power supply module removably disposed in said module receiving space, said external power supply module being provided with a set of second contacts to connect electrically with said first contacts so as to enable said external power supply module to supply electric power to said circuit unit when said external power supply module is disposed in said module receiving space;

wherein said external power supply module includes a module case formed with vent holes, and a heat-dissipating fan mounted on said module case.

2. The portable electronic apparatus as claimed in claim 1, wherein said external power supply module is adapted to convert AC power to DC power that is supplied to said circuit unit, said module case of said external power supply module being provided with a cable connector, said housing being formed with a cable hole that is aligned with said cable connector of said external power supply module when said external power supply module is disposed in said module receiving space, said portable electronic apparatus further comprising an electrical cable having a first end adapted to be connected to an AC power source and a second end extended into said module receiving space through said cable hole to connect electrically and removably with said cable connector of said external power supply module when said external power supply module is disposed in said module receiving space.

3. The portable electronic apparatus as claimed in claim 1, wherein said housing is formed with vent holes that are in fluid communication with said module receiving space.

4. The portable electronic apparatus as claimed in claim 1, wherein said housing is formed with a detachable panel that permits access to said module receiving space for installing and removing said external power supply module from said module receiving space.

5. A portable computer comprising:

a housing formed with a circuit receiving space, a module receiving space, and a cable hole for access to said module receiving space;

a circuit unit disposed in said circuit receiving space;

a set of first contacts disposed in said module receiving space and coupled electrically to said circuit unit;

an external power supply module removably disposed in said module receiving space, said external power supply module having a module case provided with a set of second contacts for contacting said first contacts so as to establish electrical connection between said external power supply module and said circuit unit when said module case is disposed in said module receiving space, said external power supply module being adapted to convert AC power to DC power that is supplied to said circuit unit through said first and second contacts when said module case is disposed in said module receiving space, said module case being further provided with a cable connector that is aligned with said cable hole when said module case is disposed in said module receiving space; and an electrical cable having a first end adapted to be connected to an AC power source and a second end extended into said module receiving space through said cable hole to connect electrically and removably with said cable connector of said external power supply module when said module case is disposed in said module receiving space, thereby permitting supply of AC power to said external power supply module;

wherein said module case is formed with vent holes, and said external power supply module further includes a heat-dissipating fan mounted on said module case.

6. The portable computer as claimed in claim 5, wherein said housing is formed with vent holes that are in fluid communication with said module receiving space.

7. The portable computer as claimed in claim 5, wherein said housing is formed with a detachable panel that permits access to said module receiving space for installing and removing said module case from said module receiving space.

* * * * *